Nov. 27, 1956  V. J. SIGODA  2,771,949
SHEARING DEVICE USED IN EMBROIDERY TRIMMING MACHINE
Filed Feb. 16, 1953  2 Sheets-Sheet 1

INVENTOR
VICTOR J. SIGODA
BY Jacob J. Bobrow
ATTORNEY

Nov. 27, 1956         V. J. SIGODA         2,771,949
SHEARING DEVICE USED IN EMBROIDERY TRIMMING MACHINE
Filed Feb. 16, 1953         2 Sheets-Sheet 2
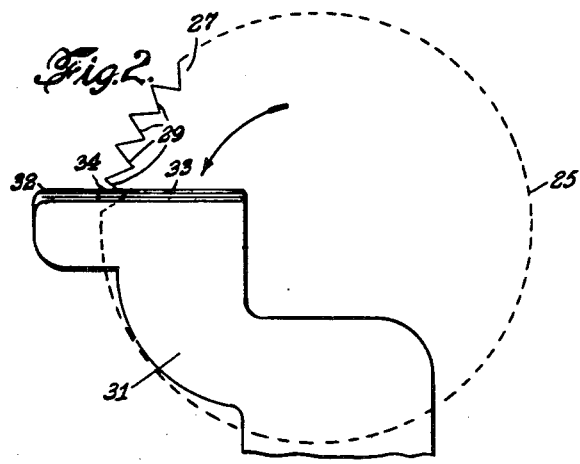
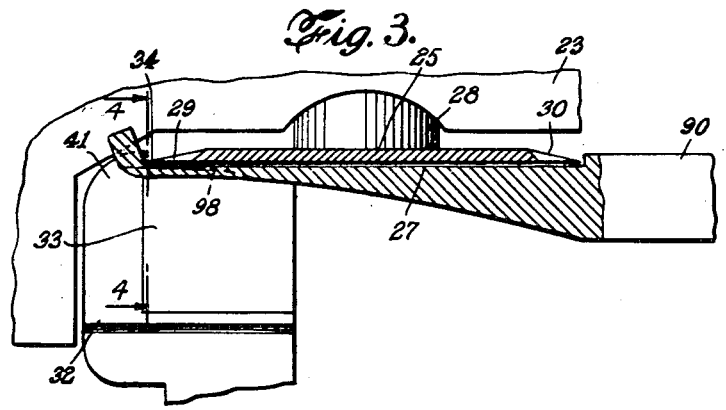
INVENTOR
VICTOR J. SIGODA
BY
Jacob J. Bobrow
ATTORNEY

United States Patent Office 2,771,949
Patented Nov. 27, 1956

2,771,949

SHEARING DEVICE USED IN EMBROIDERY TRIMMING MACHINE

Victor J. Sigoda, Great Neck, N. Y., assignor to Man-Sew Corporation, New York, N. Y., a corporation of New York Application February 16, 1953, Serial No. 336,919

3 Claims. (Cl. 164—70)

This invention relates to a trimming device used in a machine to trim the excess or waste allowance from embroidered work in the nature of scalloping. This is a continuation-in-part of application Serial No. 82,206, filed March 18, 1949, now abandoned.

An embroidery trimming machine in which the trimming device is used is disclosed in the companion continuation-in-part case which has since issued as Sigoda Patent No. 2,683,488, of July 13, 1954. Reference to said patent will disclose the details of the environment in which the device is used and its operation in such a machine.

The objects of the invention are:

(a) To provide a novel cutting mechanism including a ledger blade mounted so that it is adjacent one face of a rotating, multi-toothed shear blade;

(b) To provide a novel pivotal mounting of the ledger blade arranged so that its shear edge overhangs the axis on which it mounts, thereby taking advantage of the downward drag exerted on the work by the turning of the rotatable shear blade to bring the shear edges into closer engagement and thus effectively preventing the fabric from being drawn between the shear elements which might impair the shear action;

(c) To provide resilient means for continually urging the pivotally mounted ledger blade into abutting relationship with the shear face of the rotatable shear blade; and (d) To provide a novel rotatable shear blade having a plurality of shear edges which are capable of cooperating with the shear edge of the stationary ledger blade to make a large number of successive, short shearing cuts in the work, similar in effect to a large number of scissors blades.

Fig. 2 is an enlarged detail view showing the shearing relationship of the multiple-toothed, rotary shear blade and its cooperating stationary ledger blade;

Fig. 3 is a longitudinal section through the rotary shear blade and the associated elements of the machine of the mentioned patent.

Figure 1:
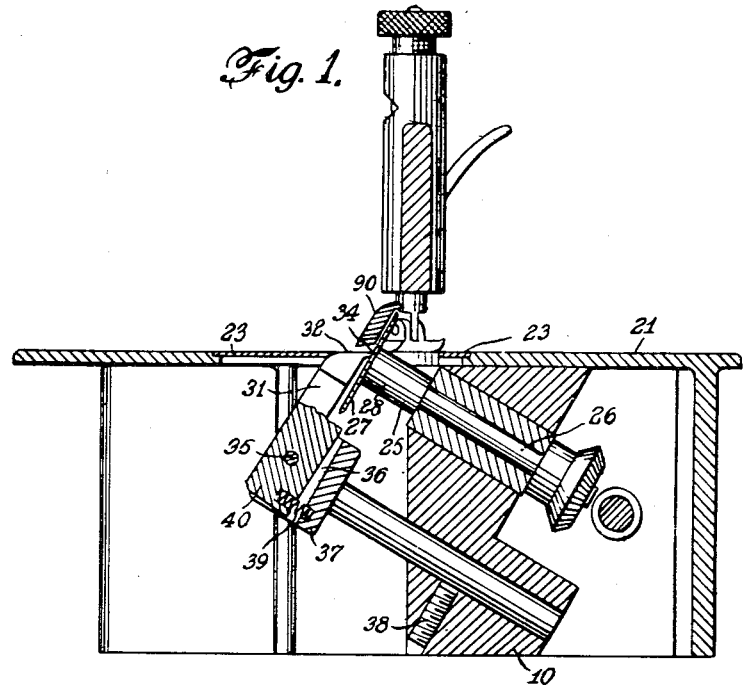
Fig. 1 is a cross-sectional view showing in detail the relationship of the cutting elements and their typical mounting in the machine of the mentioned patent.
Figure 4:
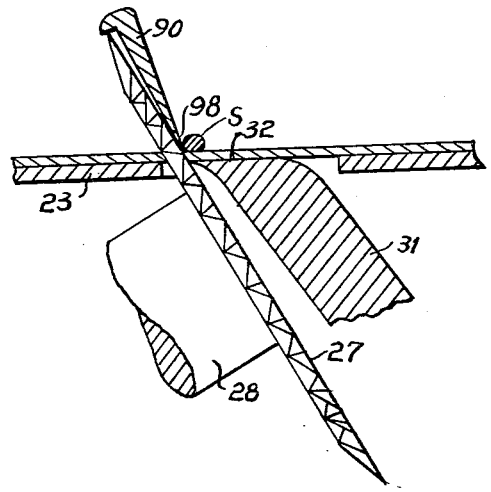
Fig. 4 is an enlarged cross-sectional view taken on line 4—4 of Fig. 3, with a fragment of the embroidered work which is trimmed by the machine of the mentioned patent included to show how the severing action is effective to separate the waste from the work.

Rotary shear member 25 is mounted for rotation on its shaft 26 in a bore in bed 10 of the machine of the mentioned patent. Although not shown, shaft 26 rotates in ball bearings for obvious reasons. Shaft 26 is driven by means of bevel gears at a suitable speed.

Shaft 26 is mounted at an oblique angle to pitch the multiple toothed shearing face 27 of rotary shear member 25 at an angle which facilitates cooperation with an embroidery senser and deflector 90, for the co-action which is fully described in said patent. The hub portion 28 of shaft 26 serves as a spacer for the proper positioning of shear face 27 with respect to the other cooperating parts.

As best shown in Figs. 2 and 3, rotary shear member 25 is provided with a large number of peripheral shearing edges 29 on face 27, and with a suitable back clearance, as by a bevel 30.

Cooperating with rotary shear member 25 is a ledger blade 33. As best shown in Fig. 1, a ledger blade mounting lever 31 is provided with a top flat surface 32, in which a ledger blade 33 may be inset as by brazing, in which case a long wearing material such as tungsten carbide may be utilized as the stationary shearing edge 34. Lever 31 is pivotally mounted by a pin 35 retained in the arms 36 of a yoked support 37, which is suitably held by its shaft portion in a bore in bed 10 in the machine of said patent, as by a set screw 38.

Shear edge 34 is resiliently urged against shear face 27 by means of spring 39 bearing against the lower end 40 of ledger blade mounting lever 31. Spring 39 is retained in a socket in support 37.

The pivotal mounting of lever 31 is so arranged that the shear edge 34 overhangs the pivot pin 35, so that the downward drag exerted on the work by the rotation of rotary shear face 27 will always tend to bring the shear edges into closer engagement, making not only for more efficient shearing action, but also preventing the material from coming between and separating the shear edges and rendering them ineffective.

Referring to Fig. 2, it will be seen that the multiple rotary shear edges 29 are inclined at such an angle, that as face 27 rotates (in this instance downwardly), there will be sequential and progressive engagement of each shear edge 29 with the stationary shear edge 34, which is highly desirable.

Ledger blade mounting lever 31 has been shaped to permit necessary clearance for the other operating parts of the machine as shown, but it need not necessarily be of this particular shape, nor need it be mounted as shown. For example, if rotary shear member 25 were to rotate upwardly, it would be entirely feasible to apply the stationary shear edge to the embroidery senser and deflector 90 at 98, in which case, the opposite shear edges on shear face 27 would be utilized.

From what has been described, it will be readily apparent that any work which is passed over plate 21 of the machine to and over the throat plate 23 to the cooperating shear edges 29 and 34, will be severed by the shearing action thereof, as power is applied to rotate shaft 26. To better support this work for this severing action, and to prevent any part of it from being drawn downwardly by the rotation of shear face 27, top surface 32 of ledger blade mounting lever 31 lies substantially flush with throat plate 23, and partially surrounds the rotary shear face 27, with suitable clearance at the nose portion 41 thereof to prevent interference with the shear edges 29.

As will be noted in Fig. 3, however, throat plate 23 does not abut the back of shear face 27, but instead, there is considerable clearance, which it is found permits any waste which might become wedged between the edge of throat plate 23 and the back of shear face 27, to be pulled out by the action of one of the feed mechanisms hereinafter referred to.

Suitable means for automatically advancing the work to the severing means, which is part of the subject matter claimed and disclosed in the companion continuation-in-part case, Serial No. 3?5,918, filed February 16, 1953, now Patent No. 2,683,, consists generally of two independent feeder mechanisms whose co-action may be varied so as to provide suitable feed motions to transport the work to the severing means in a manner which will effectively sever the waste or excess material from the edge of the embroidery.

It is desirable to trim as closely to the edge of the embroidery as possible, without actually cutting the latter. For this purpose, deflector 90 has been thinned at 98 to permit the scallop edge to come right up to the shear face 27, but to be separated therefrom sufficiently to prevent damage. The oblique mounting of rotary shear member 25 actually permits the sear edges 29 to project slightly under the applied embroidery S as the work is severed. The deflector 90 thus has no apparent thickness at 98, although the vertical wall thereof will be in contact with the raised embroidery to keep it from being cut by the rotary shear member 25.

The rotary shear member makes a multitude of short scissors-like cuts in the base material adjacent the edge of the embroidery, as the latter is supported by the stationary shear member. As deflector 90 is of reduced cross section at 98, which is in the immediate vicinity of the cutting action, and as the cutting action actually extends under the deflector at this point due to the pitch of the roary shear face 27, the result will be a series of cuts in such close proximity to the edge of the embroidery that no objectionable margin will be left.

While the presently preferred embodiment of the invention has been described in detail for the purpose of illustration, it is to be understood that the invention is not limited to the details of the construction shown and described, but is to be construed broadly within the purview of the claims.

What is claimed is:

1. A shearing device comprising a rotatable shaft mounted in a plane inclined to the vertical, a circular cutter carried thereby, said cutter having a shear face normal to the axis of rotation and a peripheral shear edge on said shear face, a second shaft mounted in a plane parallel to and in advance of the plane of said shear face, a ledger blade support pivotally mounted on said second shaft, a ledger blade on said support having a shear edge which extends over said pivotal mounting in advance of and in engagement with the upwardly facing shear edge of the cutter, said arrangement tending to bring the ledger blade shear edge into closer engagement with the shear edge of the cutter as drag is exerted by the work in resisting shear.

2. A shearing device in accordance with claim 1 in which resilient means continuously bears on the ledger blade support to urge the shear edge of the ledger blade into engagement with the shear edge of the cutter and to resist separation.

3. A shearing device in accordance with claim 1 in which the peripheral shear edge of the rotatable cutter is provided with a plurality of teeth, one shear edge of each tooth being inclined to a radial intersecting the point of its tooth.

References Cited in the file of this patent

UNITED STATES PATENTS

| | | |
|---|---|---|
| 164,920 | Judson | June 29, 1875 |
| 941,112 | Tilp | Nov. 23, 1909 |
| 997,696 | Passler | July 11, 1911 |
| 1,553,040 | Gruman | Sept. 8, 1925 |
| 1,666,969 | James | Apr. 24, 1928 |
| 1,695,688 | Hoopes | Dec. 18, 1928 |
| 2,366,271 | Lerch | Jan. 2, 1945 |